United States Patent [19]

Ikawa

[11] 4,227,824
[45] Oct. 14, 1980

[54] NON-TARNISHING PANEL EDGE SPOT WELDING ARRANGEMENT

[75] Inventor: Kunio Ikawa, Hiroshima, Japan

[73] Assignee: Toyo Kogyo Co., Ltd., Hiroshima, Japan

[21] Appl. No.: 967,911

[22] Filed: Dec. 8, 1978

[30] Foreign Application Priority Data

Dec. 9, 1977 [JP] Japan .................. 52-165838[U]

[51] Int. Cl.² .............................................. B25G 3/34
[52] U.S. Cl. .................................................. 403/271
[58] Field of Search ................ 403/13, 265, 270, 271, 403/272; 228/136, 137; 296/146

[56] References Cited

U.S. PATENT DOCUMENTS

| 1,773,818 | 8/1930 | Ledwinka | 228/136 |
| 2,071,583 | 2/1937 | Schutt | 228/137 |
| 2,550,174 | 4/1951 | Towner | 228/136 |
| 3,236,341 | 2/1966 | Chopinet et al. | 403/271 |

FOREIGN PATENT DOCUMENTS

| 404038 | 11/1924 | Fed. Rep. of Germany | 228/137 |
| 669604 | 12/1938 | Fed. Rep. of Germany | 228/138 |
| 793929 | 12/1935 | France | 228/137 |
| 401225 | 1/1943 | Italy | 228/137 |

Primary Examiner—Wayne L. Shedd
Attorney, Agent, or Firm—Fleit & Jacobson

[57] ABSTRACT

Panel assembly for automobiles such as a door panel assembly, a bonnet lid and a trunk lid has an outer and inner panels which are welded together along the peripheral portions. The inner panel is formed at the periphery thereof with one or more projections so that thermally insulative spaces are formed between the panels. The periphery of the outer panel is folded over the periphery of the inner panel so that the edge of the outer panel is laid on the projections and welded thereto at the projections. Due to the existence of the spaces, it is possible to eliminate any thermal deformation of the outer panel caused by the welding heat.

6 Claims, 9 Drawing Figures

NON-TARNISHING PANEL EDGE SPOT WELDING ARRANGEMENT

The present invention relates to panel assemblies for automobiles and more particularly to hemming structures for such panel assemblies.

Conventionally, panel assemblies such as door panels, bonnet lids and trunk lids have an outer and inner panels which are welded together at appropriate portions. Such panel assemblies include hemming structures wherein the outer panel is bent along its periphery over the inner panel and welded thereto along the edge of the outer panel by means, for example, of arc welding. In the conventional structures, the inner and outer panels are subjected to welding heat and permanent deformations are often produced in the panels. Such deformations, if produced in the outer panel, may have serious effects on the appearance of the panel assembly since the outer panel usually has a clear reflective surface after it has been coated by a paint so that even a small deformation may give a bad appearance. Further, the welding heat applied to the outer panel also has an adverse effect on the corrosion resistant property on the panel assembly.

It has therefore been necessary after the arc welding to polish the outer panel so that an improved appearance can be obtained. In order to eliminate such additional work, the welding operation may be performed with welding metal which is as small in amount as possible so that the welding heat may be reduced to a satisfactory level. However, such decrease in the amount of the welding metal weakens the strength of the welded portions and there may be produced cracks and separations in the welded portions to thereby decrease the rigidity of the panel assembly. Thus, the welding operation becomes difficult and a high skill is required in performing the arc welding.

In another type of hemming structures in the panel assemblies, the outer panel is bent along its periphery over the inner panel and the superposed edges of the inner and outer panels are curled to secure them together without using a welding technique. In this type of structures, the inner panel is formed with beads or projections which engage with the curled hem portion of the panel assembly to hold the hem portion in position. This type of hemming structures have no problem caused by the welding heat, however, they require a curling operation which is time consuming and moreover has an increased rate of disqualified products. Further, since the curled hem portion is held simply through engagement with the beads or projections formed in the inner panel, an adequate strength cannot be provided in the hem portion of the panel assembly.

It is therefore an object of the present invention to provide a panel assembly having a hem portion which has a satisfactory strength and is free from any deformation in the outer panel.

Another object of the present invention is to provide a panel assembly for automobiles having a hem portion which is formed through a welding technique but has no adverse effect on the appearance due to welding heat.

According to the present invention, the above and other objects can be accomplished by a panel assembly comprising an inner and outer panels, said inner panel having projection means formed along at least one peripheral portion thereof so as to project in a direction opposite to the outer panel, said outer panel having at least one peripheral portion bent and folded over the peripheral portion of the inner panel, said peripheral portion of the outer panel having an edge portion which are located on and welded to the projection means of the inner panel.

According to the features of the present invention, thermally insulative space means is provided between the inner and outer panels at the projection means so that it is possible to prevent the welding heat from being transmitted to the outer panel to an extent that the outer panel may be deformed. Thus, it is no longer necessary to polish the outer panel after the welding operation. Further, a highly skilled technique is not required in performing the arc welding operation. Another advantage of the projection means formed on the inner panel is that the projection means can be utilized for locating the outer panel with respect to the inner panel.

According to one mode of the present invention, the projection means may be in the form of one or more elongated beads extending along the periphery of the inner panel and the outer panel may be welded to the bead or beads at intermittent portions. Alternatively, the projection means may be in the form of part-spherical projections spaced apart one from the other along the periphery of the inner panel. In such a case, the edge of the outer panel may have semicircular cutouts so that the edge can be fitted to the projections at the cutouts. The projections may be of such configurations having flattened tops.

The above and other objects and features of the present invention will become apparent from the following descriptions taking reference to the acompanying drawings, in which.

Figure 1:
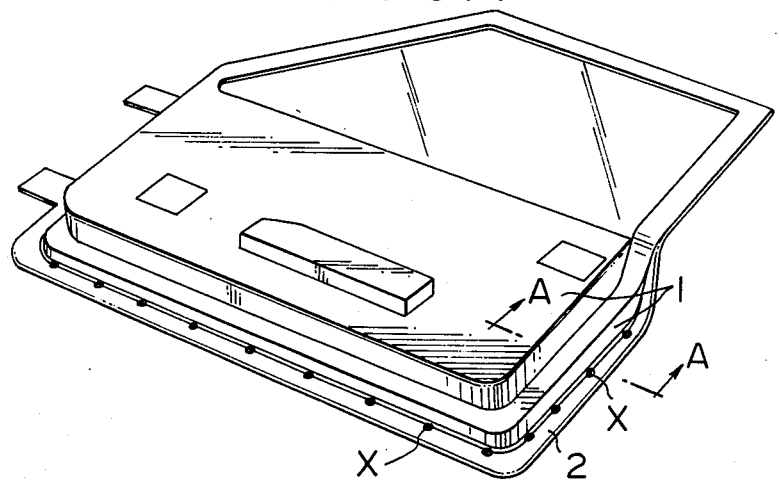
FIG. 1 is a side view of an automobile door panel assembly to which the present invention can be applied.
Figure 2:
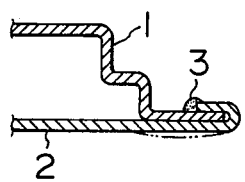
FIG. 2 is an enlarged sectional view of the hemming structure of a panel assembly in accordance with a conventional construction.

Referring to the drawings, particularly to FIG. 1, there is shown a door panel assembly comprised of an inner panel 1 and an outer panel 2 which is connected at the outer periphery with the inner panel 1. According to a conventional structure, the outer panel 2 is bent at its periphery over the adjacent edge of the inner panel 2 and welded thereto by an arc welding technique as shown by the reference numeral 3 in FIG. 2. In this known structure, the outer panel 2 is subjected to a welding heat and often deformed as shown by phantom lines in FIG. 2. Further, the heat applied to the outer panel 2 sometimes causes corrosion of the panel.

In an alternative arrangement, the peripheral portion of the outer panel 2 is curled together with the inner panel 1 with an edge 5 of the curled portion in engagement with a bead 4 formed on the inner panel 1. The arrangement is free from the adverse effect of the welding heat, however, it requires a complicated operation in curling the peripheral portion of the outer panel 2 with the inner panel 1 as previously described. Further, the arrangement does not have an adequate mechanical strength.

Figure 4:
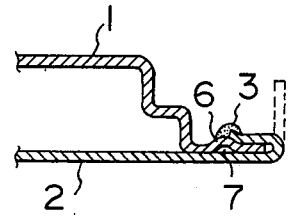
FIG. 4 is a sectional view taken substantially along the line A—A in FIG. 1 and showing one embodiment of the present invention.
Figure 3:
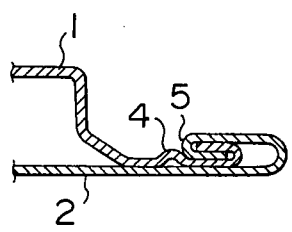
FIG. 3 is a sectional view similar to FIG. 2 but showing another example of prior art.
Figure 5:
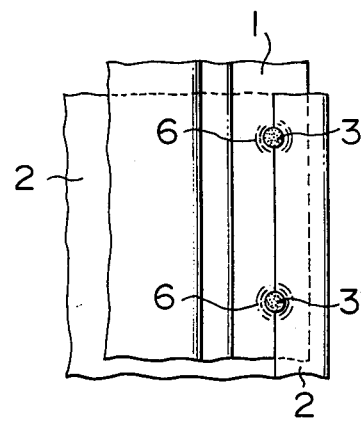
FIG. 5 is a fragmentary plan view of the panel assembly shown in FIG. 4.
Figure 6:
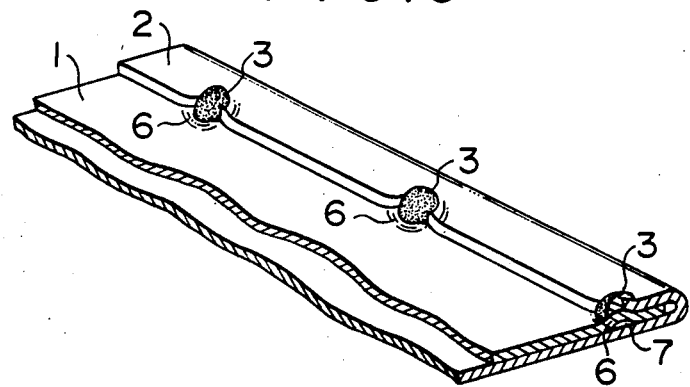
FIG. 6 is a perspective view of the panel assembly shown in FIGS. 4 and 5.

Referring now to FIGS. 4 through 6 which show one embodiment of the present invention, the inner panel 1 is formed with a series of projections 6 arranged in a row extending along the periphery of the panel 1. The projection 6 has a part-spherical configuration and the outer panel 2 is bent at its peripheral portion over the inner panel 1 so that the edge of the panel 2 is positioned on the projections 6. Further, the edge of the outer panel 2 is welded to the inner panel 1 at the projection 6 as shown by the reference numeral 3 in the drawings.

Figure 7:
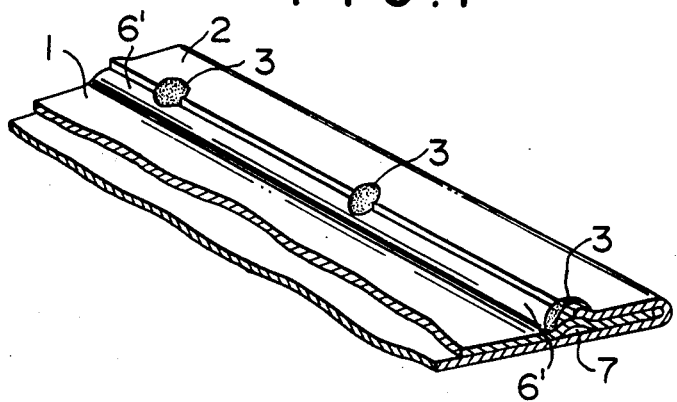
FIG. 7 is a perspective view showing another embodiment of the present invention.
Figure 8:
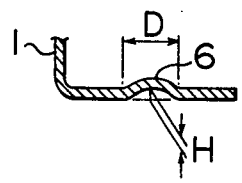
FIG. 8 is a sectional view of a projection formed in the inner panel in accordance with the feature of the present invention.

In the embodiment shown in FIG. 7, the inner panel 1 is formed with an elongated continuous bead 6' to which the edge of the outer panel 2 is welded at spaced portions as shown by the reference numeral 3 in FIG. 7. In this embodiment as well as in the previous embodiment, the projections 6 and 6' have a semi-circular cross-sectional configuration as shown in FIG. 8 having a width D and a height H. The outer panel 2 is welded to the inner panel 1 along its periphery at portions marked by X and the projections 6 and 6' may be seen when the panel assembly is opened. It is therefore preferable from the viewpoint of appearance that the width D is approximately 5 mm and the height H approximately 1 mm.

Figure 9:
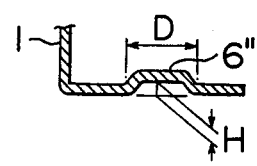
FIG. 9 is a sectional view similar to FIG. 8 but showing an alternative configuration of the projection.

The embodiment shown in FIG. 7 is considered as being advantageous in that a corrosion resistant agent can conveniently be applied to the junction between the inner and outer panels 1 and 2 since the junction can be substantially straight. The projections 6 and 6' may not necessarily be of a semi-circular cross-sectional configuration but may have a flattened top as shown by the reference numeral 6" in FIG. 9.

According to the features of the present invention, a space or spaces 7 are formed between the inner and outer panels 1 and 2 at the portion or portions where the projection or projections 6 are formed. The spaces 7 provide thermal insulation between the panels 1 and 2 so that they function to prevent or at least restrict the welding heat from being transmitted from the inner panel 1 to the outer panel 2. Thus, it is possible to suppress thermal deformation of the outer panel as experienced in a conventional structure. Further, the projections can be used for locating the outer panel with respect to the inner panel.

The invention has thus been shown and described with reference to specific embodiments, however, it should be noted that the invention is in no way limited to the details of the illustrated arrangements but changes and modifications may be made without departing from the scope of the appended claims.

I claim:

1. Panel assembly for automobiles which comprises inner and outer panels, said inner panel having projection means formed along at least one peripheral portion thereof so as to project in a direction perpendicularly opposite to the outer panel, said outer panel having at least one peripheral portion bent and folded over the peripheral portion of the inner panel, said peripheral portion of the outer panel having an edge portion which is located on and welded to the projection means of the inner panel.

2. Panel assembly in accordance with claim 1 in which said projection means includes a plurality of part-spherical projections which are arranged in a row along the peripheral portion of the inner panel.

3. Panel assembly in accordance with claim 1 in which said projection means includes at least one bead extending along the peripheral portion of the inner panel.

4. Panel assembly in accordance with claim 3 in which said bead is of a semi-circular cross-sectional configuration.

5. Panel assembly in accordance with claim 3 in which said bead has a flattened top.

6. Panel assembly in accordance with claim 1 in which said projection means includes a plurality of projections which have flattened tops and are arranged in a row along the peripheral portion of the inner panel.

* * * * *